(12) United States Patent
Manabe et al.

(10) Patent No.: US 9,965,234 B1
(45) Date of Patent: May 8, 2018

(54) INFORMATION PROCESSING APPARATUS, METHOD OF DISTRIBUTING A PRINT JOB, AND NON-TRANSITORY COMPUTER READABLE RECORDING MEDIUM (71) Applicant: KYOCERA DOCUMENT SOLUTIONS INC., Osaka (JP)

(72) Inventors: Hiroshi Manabe, Concord, CA (US); Sang Yoon Lee, Concord, CA (US); Katherine Bayquen Lao, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days. days.

(21) Appl. No.: 15/336,236

(22) Filed: Oct. 27, 2016

(51) Int. Cl.
*G06F 3/12* (2006.01)

(52) U.S. Cl.
CPC ............ *G06F 3/126* (2013.01); *G06F 3/1206* (2013.01); *G06F 3/1276* (2013.01)

(58) Field of Classification Search
CPC ................................ G06F 3/126; G06F 3/1206
See application file for complete search history.

(56) References Cited

U.S. PATENT DOCUMENTS

| 2003/0053105 A1* | 3/2003 | Morooka | G06F 3/1204 358/1.13 |
| 2003/0117638 A1* | 6/2003 | Ferlitsch | G06F 3/1204 358/1.13 |
| 2011/0063660 A1* | 3/2011 | Yamada | G06F 3/1203 358/1.15 |

FOREIGN PATENT DOCUMENTS

JP    2000-322220 A    11/2000

* cited by examiner

*Primary Examiner* — Ibrahim Siddo
(74) *Attorney, Agent, or Firm* — Li & Cai Intellectual Property (USA) Office (57) ABSTRACT

An information processing apparatus includes: printer driver circuits that drive different image forming devices, respectively; a virtual printer driver circuit that describes a document to be printed in a device-independent format to generate device-independent spool data, and describes a variable for printing the document in a standard print setting storage format to generate standard-format job data; and a distribute circuit that selects a printer driver circuit to generate print data of the document based on the variable described in the standard-format job data out of the printer driver circuits, and supplies the device-independent spool data and the standard-format job data to the selected printer driver circuit.

15 Claims, 5 Drawing Sheets

| Condition Name | Print size | Color mode | Duplex | Distribution Destination Printer Driver |
|---|---|---|---|---|
| Distribution Condition (1) | A3 | Full-color | No | First printer driver 108 |
| Distribution Condition (2) | Less than A4 | Full-color | Yes | Third printer driver 110 |
| Distribution Condition (3) | A5 | B/W | No | Second printer driver 109 |
| Other than above | — | — | — | Third printer driver 110 |

FIG.5

INFORMATION PROCESSING APPARATUS, METHOD OF DISTRIBUTING A PRINT JOB, AND NON-TRANSITORY COMPUTER READABLE RECORDING MEDIUM

BACKGROUND OF THE INVENTION

1. Field of the Invention

The present disclosure relates to an information processing apparatus, a method of distributing a print job by the information processing apparatus, and a non-transitory computer readable recording medium that records a program for distributing print jobs to image forming devices.

2. Description of Related Art

There is known a technology for distributing print jobs to image forming devices.

SUMMARY OF THE INVENTION

According to an embodiment of the present disclosure, there is provided an information processing apparatus, including: printer driver circuits that drive different image forming devices, respectively; a virtual printer driver circuit that describes a document to be printed in a device-independent format to generate device-independent spool data, and describes a variable for printing the document in a standard print setting storage format to generate standard-format job data; and a distribute circuit that selects a printer driver circuit to generate print data of the document based on the variable described in the standard-format job data out of the printer driver circuits, and supplies the device-independent spool data and the standard-format job data to the selected printer driver circuit.

According to an embodiment of the present disclosure, there is provided a method of distributing a print job by an information processing apparatus, the information processing apparatus including printer driver circuits that drive different image forming devices, respectively, the method including: describing a document to be printed in a device-independent format to generate device-independent spool data; describing a variable for printing the document in a standard print setting storage format to generate standard-format job data; selecting a printer driver circuit to generate print data of the document based on the variable described in the standard-format job data out of the printer driver circuits; and supplying the device-independent spool data and the standard-format job data to the selected printer driver circuit.

According to an embodiment of the present disclosure, there is provided a non-transitory computer readable recording medium that records a program executable by a computer of an information processing apparatus, the information processing apparatus including printer driver circuits that drive different image forming devices, respectively, and a virtual printer driver circuit that describes a document to be printed in a device-independent format to generate device-independent spool data, and describes a variable for printing the document in a standard print setting storage format to generate standard-format job data, the program causing the computer to: select a printer driver circuit to generate print data of the document based on the variable described in the standard-format job data out of the printer driver circuits; and supply the device-independent spool data and the standard-format job data to the selected printer driver circuit.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Configuration of Job Distribution System

Figure 1:
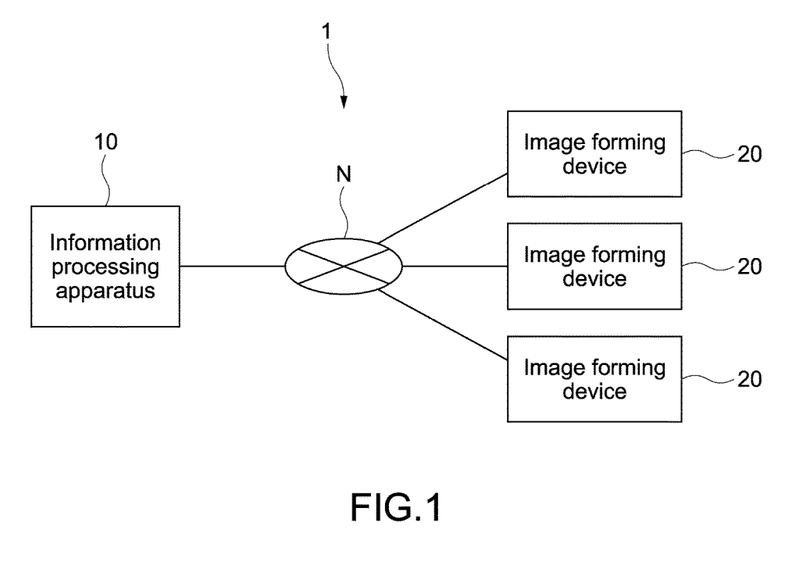
FIG. 1 shows a job distribution system according to an embodiment of the present disclosure.

FIG. 1 shows a job distribution system according to an embodiment of the present disclosure.

The job distribution system 1 includes the information processing apparatus 10 and the image forming devices 20. The information processing apparatus 10 and the image forming devices 20 are connected to the network N. The information processing apparatus 10 and each image forming device 20 are capable of communicating with each other via the network N. The network N is, for example, an LAN (Local Area Network) in an office. The information processing apparatus 10 and the image forming devices are installed in the office.

The information processing apparatus 10 is, for example, an information terminal such as a personal computer that a worker (user) at the office uses. The information processing apparatus 10 is capable of distributing a print job of a document, which is created by application software installed in the information processing apparatus 10, to one of the image forming devices 20 via the network N.

Each image forming device 20 is capable of obtaining a print job from the information processing apparatus 10 via the network N and executing the print job. Typically, the specs of the image forming devices 20 are different. For example, a first image forming device 20 is a high-spec MFP (Multifunction Peripheral), a second image forming device 20 is a low-spec black-and-white printer, and a third image forming device 20 is a high-spec MFP. Hereinafter, those image forming devices 20 will be referred to as the first the image forming device 20A, the second image forming device 20B, and the third image forming device 20C.

2. Hardware Configuration of Information Processing Apparatus

Figure 2:
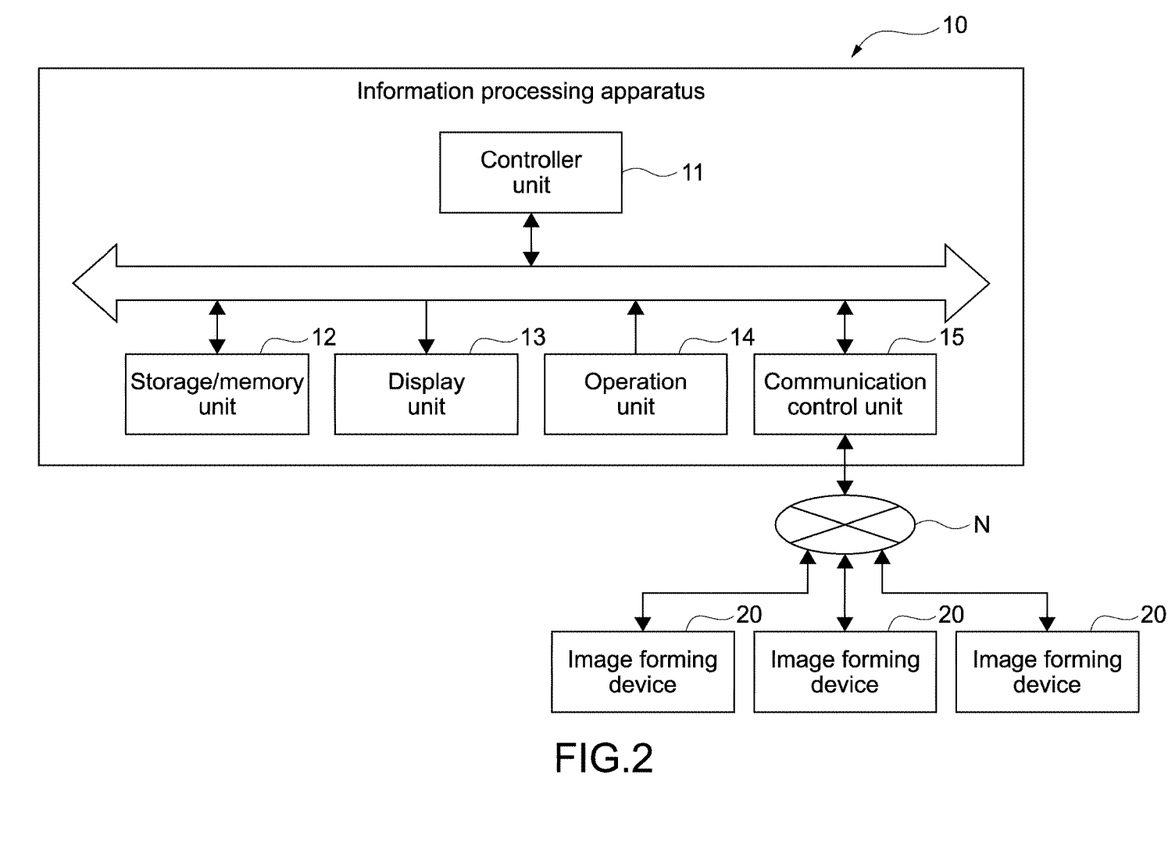
FIG. 2 shows a hardware configuration of an information processing apparatus.

FIG. 2 shows a hardware configuration of the information processing apparatus.

The information processing apparatus 10 includes the controller unit 11, and the storage/memory unit 12, the display unit 13, the operation unit 14, and the communication control unit 15 connected to the controller unit 11 via the bus 16.

The controller unit 11 includes CPU (Central Processing Unit) and the like. The CPU of the controller unit 11 loads programs recorded in a ROM (Read Only Memory), which is an example of a non-transitory computer readable recording medium, into a RAM (Random Access Memory) and executes the programs.

The storage/memory unit 12 includes the ROM, the RAM, and large-volume storage such as an HDD (Hard Disk Drive). The ROM fixedly records the programs executable by the controller unit 11, data, and the like. The programs recorded in the ROM is loaded into the RAM.

The display unit 13 includes an LCD (Liquid Crystal Display), an organic EL (Electroluminescence) display, or the like. The display unit 13 performs arithmetic processing based on information supplied from the controller unit 11, and outputs generated image signals. Typically, the display unit 13 is an external display apparatus.

The operation unit 14 includes a keyboard, a mouse, various switches, and the like. The operation unit 14 detects operation by a user, and outputs detection signals to the controller unit 11.

The communication control unit 15 is an interface for connecting to the network N to which the image forming devices 20 are connected.

3. Functional Configuration of Information Processing Apparatus

Figure 3:
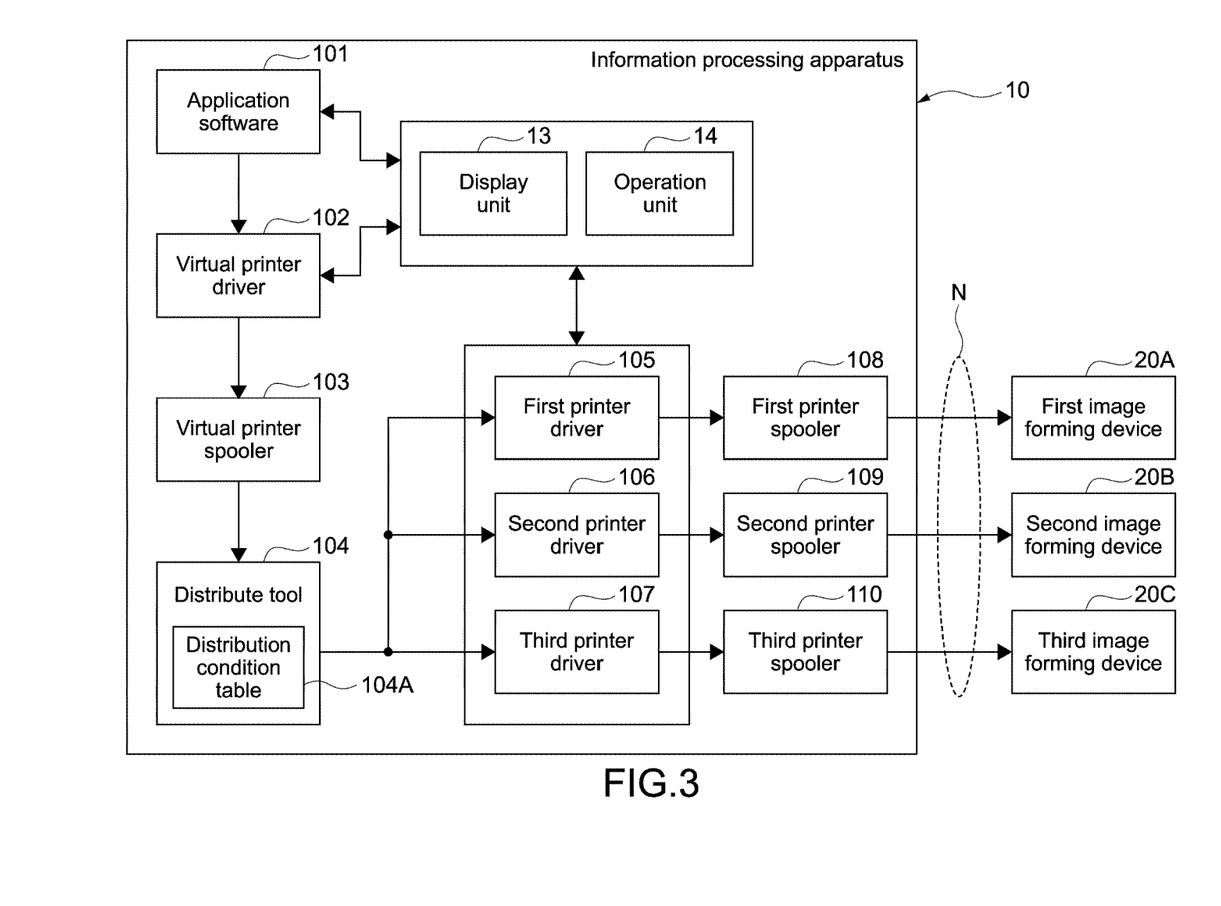
FIG. 3 shows a functional configuration of the information processing apparatus.

FIG. 3 shows a functional configuration of the information processing apparatus.

The controller unit 11 of the information processing apparatus 10 loads the programs recorded in the ROM, which is an example of a non-transitory computer readable recording medium, into the RAM and executes the programs to thereby function as the application software 101, the virtual printer driver 102, the virtual printer spooler 103, the distribute tool 104, the printer drivers 105, 106, and 107, and the printer spoolers 108, 109, and 110.

Typically, the application software 101, the virtual printer driver 102, the distribute tool 104, and the printer drivers 105, 106, and 107 are realized by individual software programs previously installed in the information processing apparatus 10. The virtual printer spooler 103 and the printer spoolers 108, 109, and 110 are realized by the standard printer spooler of the OS (operating system) of the information processing apparatus 10.

The application software 101 is word processor software, spreadsheet software, or the like. The application software 101 creates a document to be printed.

The virtual printer driver 102 describes a document to be printed in a device-independent format to generate device-independent spool data. The "device-independent" means that all the printer drivers 105, 106, and 107 installed in the information processing apparatus 10 are capable of interpreting. Specific examples of the "device-independent format" include EMF (Enhanced Metafile) and XPS (XML Paper Specification).

The virtual printer driver 102 describes variables for printing the document in a standard print setting storage format to generate standard-format job data. All the printer drivers 105, 106, and 107 installed in the information processing apparatus 10 are capable of interpreting the standard-format job data described in the standard print setting storage format. Specific examples of the "standard print setting storage format" include DEVMODE and PrintTicket. DEVMODE describes information on the environment of an image forming device. PrintTicket describes information on print-job functions such as duplex and staple.

The virtual printer spooler 103 spools the device-independent spool data and the standard-format job data generated by the virtual printer driver 102, and passes the device-independent spool data and the standard-format job data to the distribute tool 104.

The distribute tool 104 selects a printer driver to generate print data of the document out of the printer drivers 105, 106, and 107 based on the variables of functions described in the standard-format job data from the virtual printer spooler 103. The distribute tool 104 starts up the selected printer driver 105, 106, or 107, and supplies the device-independent spool data and the standard-format job data spooled by the virtual printer spooler 103 to the selected printer driver 105, 106, or 107.

The printer drivers 105, 106, and 107 drive the image forming devices 20A, 20B, and 20C, respectively. Specifically, each printer driver 105, 106, or 107 interprets the device-independent spool data and the standard-format job data obtained from the distribute tool 104, and generates print data described in a PDL (Page Description Language) that the image forming device 20A, 20B, or 20C driven by each printer driver 105, 106, or 107 is capable of interpreting. Each printer driver 105, 106, or 107 supplies the generated print data to each image forming device 20A, 20B, or 20C via each printer spooler 108, 109, or 110.

Each printer spooler 108, 109, or 110 spools the print data generated by each printer driver 105, 106, or 107.

4. Job Distributing Method

Figure 4:
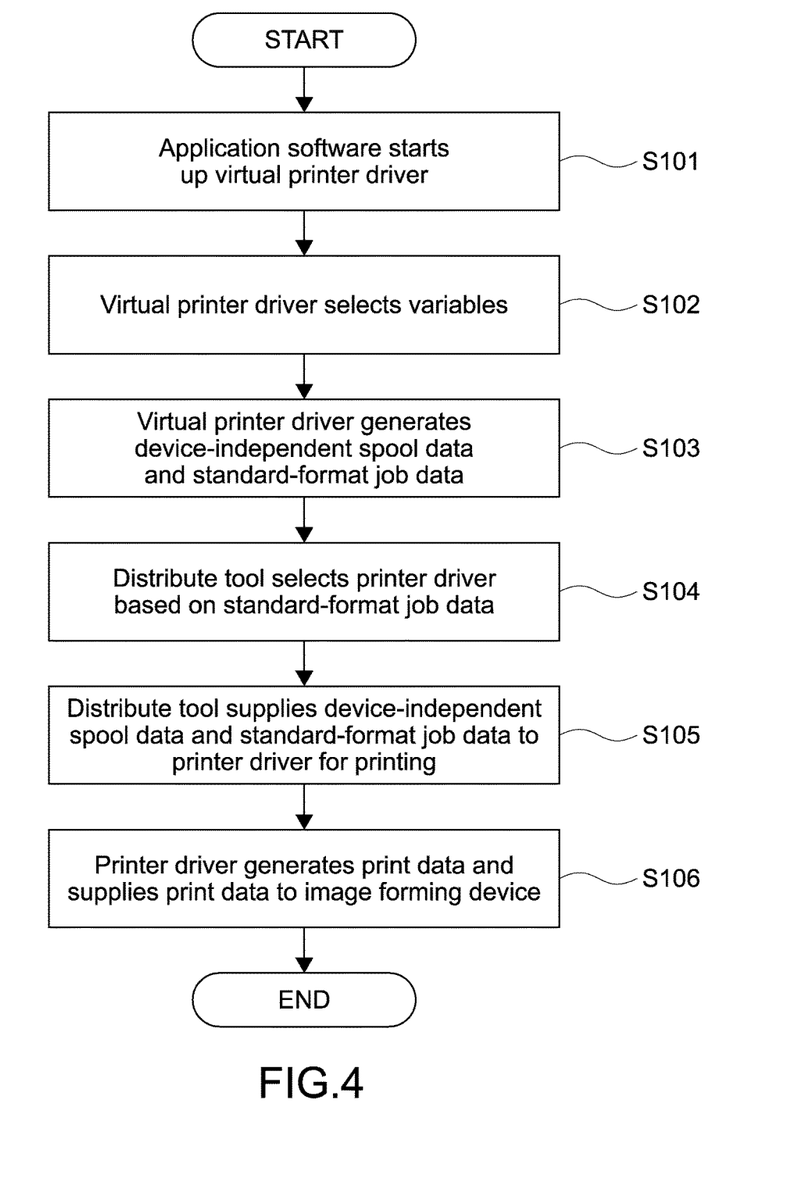
FIG. 4 shows a flowchart of the job distributing method.

FIG. 4 shows a flowchart of the job distributing method.

The application software 101 detects a predetermined operation input in the operation unit 14 by a user as a command to print a document created by the application software 101. Upon detecting the command to print a document, the application software 101 starts up the virtual printer driver 102, and outputs the created document (Step S101).

Upon starting up, the virtual printer driver 102 displays, on the display unit 13, a user interface for selecting variables of functions. The "functions" are functions that all the printer drivers 105, 106, and 107 installed in the information processing apparatus 10 are capable of executing, and are typically basic functions. For example, the "functions" include print size, color mode, duplex, print orientation, number of copies, and the like, which are basic functions to be selected by a user. In other words, the functions that the virtual printer driver 102 can select do not include functions that only one/some printer driver(s) is/are capable of executing such as staple and punch. The "variable" is a variable to be selected for each function, e.g., a variable "A4" for a function "print size". The virtual printer driver 102 accepts predetermined operations input in the operation unit 14 by the user as variables selected by the user (Step S102).

The virtual printer driver 102 describes a document to be printed in a device-independent format to generate device-independent spool data. The virtual printer driver 102 describes variables for printing the document in a standard print setting storage format to generate standard-format job data (Step S103). The virtual printer driver 102 spools the generated standard-format job data and device-independent spool data in the virtual printer spooler 103.

The distribute tool 104 is monitoring the virtual printer spooler 103, and receives the standard-format job data and device-independent spool data spooled by the virtual printer spooler 103. The distribute tool 104 extracts the variables of the functions included in the standard-format job data. The distribute tool 104 selects a printer driver to generate print data of the document out of the printer drivers 105, 106, and 107 based on the variables described in the standard-format job data (Step S104).

By the way, a specific example of the flow from the selection of variables (Step S102) to the selection of a printer driver (Step S104) will be described.

In this example, the specs of the first image forming device 20A driven by the first printer driver 105, the second image forming device 20B driven by the second printer driver 106, and the third image forming device 20C driven by the third printer driver 107 are as follows.

The first image forming device 20A: full-color available, A3-size available, staple/punch available, and user authentication available.

The second image forming device 20B: full-color unavailable, A3-size available, staple/punch unavailable, and user authentication unavailable.

The third image forming device 20C: full-color available, A3-size unavailable, staple/punch unavailable, and user authentication available.

In this example, the virtual printer driver 102 accepts, as the variables selected by a user, the variable "A3" of the function "print size", the variable "full-color" of the function "color mode", and the variable "No" of the function "duplex" (Step S102). The virtual printer driver 102 describes the variables (the variable "A3" of the function "print size", the variable "full-color" of the function "color mode", and the variable "No" of the function "duplex") for printing the document in a standard print setting storage format to generate standard-format job data (Step S103).

Figure 5:
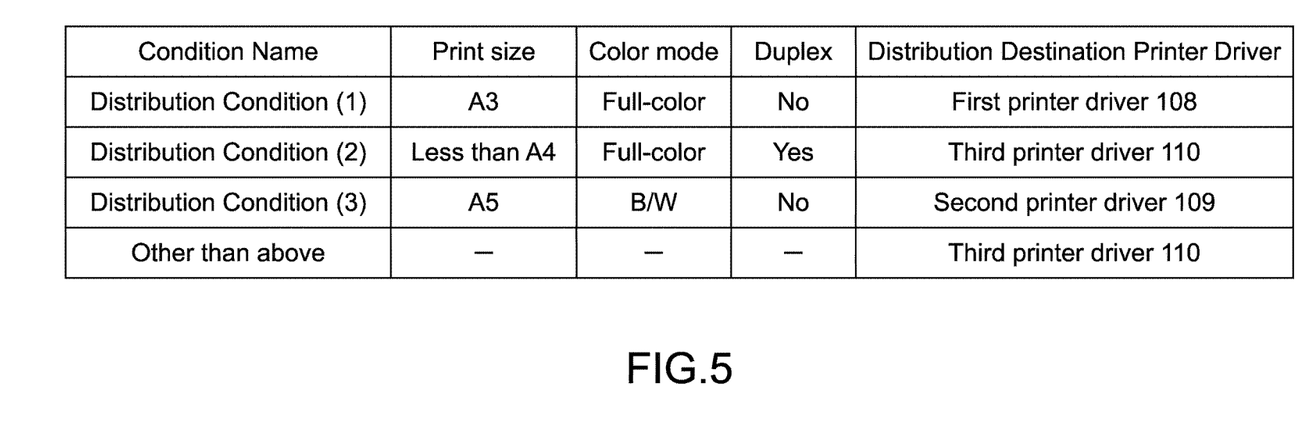
FIG. 5 shows an example of a distribution condition table.

The distribute tool 104 retrieves a table (distribution condition table 104A) that records combinations of variables of functions and the printer drivers 108, 109, and 110 in association with each other, and selects a printer driver to execute the print job (Step S104).

FIG. 5 shows an example of the distribution condition table.

The distribution condition table 104A records combinations of variables of functions (distribution conditions) and the printer drivers 108, 109, and 110 (distribution-destination printer drivers) in association with each other. In this example, the distribution condition table 104A records the distribution conditions (1) to (3) and (other than above) and the printer drivers 108, 109, and 110 as follows, respectively.

The distribution condition (1): Combination of the variable "A3" of the function "print size", the variable "full-color" of the function "color mode", and the variable "No" of the function "duplex". The distribution-destination is the first printer driver 108.

The distribution condition (2): Combination of the variable "less than A4" of the function "print size", the variable "full-color" of the function "color mode", and the variable "Yes" of the function "duplex". The distribution-destination is the third printer driver 110.

The distribution condition (3): Combination of the variable "A5" of the function "print size", the variable "black-and-white printer" of the function "color mode", and the variable "No" of the function "duplex". The distribution-destination is the second printer driver 109.

The distribution condition (other than above): The distribution-destination is the third printer driver 110.

The priority of the distribution conditions (1) to (3) descends in this order. In other words, the distribution condition (1) has the highest (first) priority and the distribution condition (3) has the lowest (third) priority. Therefore, firstly, the distribute tool 104 determines if the combination of the accepted variables (Step S102) matches the distribution condition (1) having the first priority or not, and if matches, selects the first printer driver 108 in association with the distribution condition (1). When the combination of the variables does not match the distribution condition (1), next, the distribute tool 104 determines if the combination of the variables matches the distribution condition (2) having the second priority or not, and if matches, selects the third printer driver 110 in association with the distribution condition (2). When the combination of the variables does not match the distribution condition (2), next, the distribute tool 104 determines if the combination of the variables matches the distribution condition (3) having the third priority or not, and if matches, selects the second printer driver 109 in association with the distribution condition (3). When the combination of the variables matches none of the distribution conditions of the distribution condition table 104A, the distribute tool 104 selects the third printer driver 110 in association with the distribution condition (other than above).

FIG. 5 shows the three distribution conditions (1) to (3), for example. Alternatively, as a matter of course, four or more distribution conditions may be provided. A user may previously and as necessary input distribution conditions and priority in the distribution condition table 104A by using the distribute tool 104 to customize the distribution condition table 104A. For example, a high-spec image forming device may have higher priority, and a low-spec image forming device may have lower priority. Alternatively, a more-frequently-used image forming device may have higher priority, and a less-frequently-used image forming device may have lower priority.

In this example, firstly, the distribute tool 104 determines if the combination of the accepted variables (the variable "A3" of the function "print size", the variable "full-color" of the function "color mode", and the variable "No" of the function "duplex") matches the distribution condition (1) having the highest priority or not. The combination of the variables of the functions selected by the user matches the combination of the variables of the functions of the distribution condition (1). Therefore the distribute tool 104 determines that the combination of the accepted variables matches the distribution condition (1), and selects the first printer driver 108 in association with the distribution condition (1). In this way, the distribute tool 104 selects, as the printer driver to execute the print job, the first printer driver 108 in association with the combination of the variables of the functions selected by the user.

With reference to FIG. 4 again, the flowchart of the job distributing method will be described again.

The distribute tool 104 starts up the selected first printer driver 105, and supplies the device-independent spool data and the standard-format job data spooled by the virtual printer spooler 103 to the first printer driver 105, and causes the selected first printer driver 105 to generate print data for printing (Step S105). The distribute tool 104 deletes the device-independent spool data and the standard-format job data from the virtual printer spooler 103.

Upon starting up, the first printer driver 105 displays, on the display unit 13, a user interface for selecting variables of functions specific to the first printer driver 105. Examples of the "functions specific to a printer driver" may include staple, punch, user authentication, and storing a job. The first printer driver 105 accepts a predetermined operation input in the operation unit 14 by the user as variables of the functions specific to the first printer driver 105 selected by the user. The first printer driver 105 interprets the device-independent spool data and the standard-format job data, and generates print data further including the variables of the functions specific to the first printer driver 105. The generated "print data" is print data described in a PDL (Page Description Language) that the first image forming device 20A is capable of interpreting. Therefore the print data generated by the first printer driver 105 includes the variables of the basic functions described in the standard-format job data and the variables of the functions specific to the first printer driver 105. The first printer driver 105 spools the generated print data in the first printer spooler 108, and supplies the print data to the first image forming device 20A via the network N (Step S106).

The first image forming device 20A obtains the print data from the first printer driver 105 via the network N. The first image forming device 20A interprets the obtained print data and executes the print job.

5. Conclusion

To generate print data by a printer driver and thereafter select an image forming device to execute a print job may be one way to distribute a print job to an image forming device. However, according to this method, the functions of the image forming device may not be used at a maximum.

To the contrary, according to this embodiment, the virtual printer driver 102 generates the device-independent spool data and the standard-format job data including variables of basic functions. The selected printer driver 105, 106, or 107 interprets the device-independent spool data and the standard-format job data, and generates print data further including variables of device-specific functions. In a sense, the virtual printer driver 102 performs virtual printing, and thereafter the selected printer driver 105, 106, or 107 performs re-printing.

Therefore the functions of each printer driver 105, 106, or 107 and the functions of each image forming device 20A, 20B, or 20C may be used at a maximum. In other words, the available functions of each printer driver 105, 106, or 107 and the available functions of each image forming device 20A, 20B, or 20C are not reduced even after distribution.

Further, each printer driver 105, 106, or 107 dedicated to each image forming device 20A, 20B, or 20C generates print data. In other words, each printer driver 105, 106, or 107 generates print data in a language dedicated to each image forming device 20A, 20B, or 20C. Therefore each image forming device 20A, 20B, or 20C obtains the appropriate print result, and device-dependent print failures may be reduced.

Further, the virtual printer driver 102 generates the standard-format job data, which describes only variables of basic functions that are described in a standard print setting storage format, and the device-independent spool data. Each printer driver 105, 106, or 107 describes functions specific to each image forming device 20A, 20B, or 20C. Therefore the distribute tool 104 may distribute a print job to an image forming device appropriately irrespective of, for example, difference of manufacturers of the image forming devices 20A, 20B, and 20C although PDLs are different between manufacturers, typically. For example, a print job may be distributed to an image forming device of a specific manufacturer when the print size is A4, and another print job may be distributed to an image forming device of another manufacturer when the print size is other than A4.

Further, the virtual printer driver 102 presents a user interface for selecting variables of basic functions, and accepts variables selected by a user. Therefore the user selects variables without any feeling of strangeness as if he inputs variables of a user interface of a typical printer driver.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   printer driver circuits that drive different image forming devices, respectively;
   a virtual printer driver circuit configured to perform virtual printing that
      describes a document to be printed in a device-independent format to generate device-independent spool data, and
      describes a variable for printing the document in a standard print setting storage format to generate standard-format job data; and
   a distribute circuit that
      selects a printer driver circuit to generate print data of the document based on the variable described in the standard-format job data out of the printer driver circuits by retrieving a table that records combinations of variables of functions and the printer driver circuits in association with each other, and by selecting a printer driver circuit in association with a combination of variables of functions selected by the user, and
      supplies the device-independent spool data and the standard-format job data to the selected printer driver circuit, wherein
   the selected printer driver circuit configured to perform re-printing after the virtual printing
      obtains the device-independent spool data and the standard-format job data from the distribute circuit,
      interprets the device-independent spool data and the standard-format job data and generates print data, an image forming device driven by the selected printer driver circuit being capable of interpreting the print data, the print data including a variable of a function specific to the image forming device driven by the selected printer driver circuit, and
      supplies the print data to the image forming device.

2. The information processing apparatus according to claim 1, wherein
   the virtual printer driver circuit
      presents a user interface for selecting, as the variable, a variable of a function, all the image forming devices being capable of executing the function, and
      accepts, as the variable, the variable of the function selected by a user.

3. The information processing apparatus according to claim 2, wherein
   the distribute circuit selects a printer driver circuit that supports the variable described in the standard-format job data.

4. The information processing apparatus according to claim 1, wherein
   the image forming devices are provided by different manufacturers, and kinds of print data, the image forming devices being capable of interpreting the print data, are different depending on the manufacturers of the image forming devices.

5. The information processing apparatus according to claim 1, wherein
the device-independent format is EMF (Enhanced Metafile) or XPS (XML Paper Specification).

6. The information processing apparatus according to claim 1, wherein
the standard print setting storage format is DEVMODE or PrintTicket.

7. The information processing apparatus according to claim 1, wherein
the combinations of variables of functions recorded in the table are distribution conditions,
the distribution conditions in the table have different priorities, and
the distribute circuit
determines if the combination of variables of functions selected by the user matches the distribution conditions or not in a descending order of the priorities, and
selects a printer driver circuit in association with the combination of variables of functions that matches the distribution condition having a higher priority.

8. The information processing apparatus according to claim 7, wherein
the distribute circuit records the distribution conditions and the priorities in the table depending on at least one of specs and use-frequencies of the image forming devices to customize the table.

9. A method of distributing a print job by an information processing apparatus, the information processing apparatus including printer driver circuits that drive different image forming devices, respectively, the method comprising:
by a virtual printer driver circuit configured to perform virtual printing,
describing a document to be printed in a device-independent format to generate device-independent spool data, and
describing a variable for printing the document in a standard print setting storage format to generate standard-format job data;
by a distribute circuit,
selecting a printer driver circuit to generate print data of the document based on the variable described in the standard-format job data out of the printer driver circuits by retrieving a table that records combinations of variables of functions and the printer driver circuits in association with each other, and by selecting a printer driver circuit in association with a combination of variables of functions selected by the user, and
supplying the device-independent spool data and the standard-format job data to the selected printer driver circuit; and
by the selected printer driver circuit configured to perform re-printing after the virtual printing,
obtaining the device-independent spool data and the standard-format job data from the distribute circuit,
interpreting the device-independent spool data and the standard-format job data and generates print data, an image forming device driven by the selected printer driver circuit being capable of interpreting the print data, the print data including a variable of a function specific to the image forming device driven by the selected printer driver circuit, and
supplying the print data to the image forming device.

10. The method of distributing a print job according to claim 9, wherein
the step of describing a variable includes
presenting a user interface for selecting, as the variable, a variable of a function, all the image forming devices being capable of executing the function, and
accepting, as the variable, the variable of the function selected by a user.

11. The method of distributing a print job according to claim 10, wherein
the step of selecting a printer driver circuit includes
selecting a printer driver circuit that supports the variable described in the standard-format job data.

12. The method of distributing a print job according to claim 9, wherein
the image forming devices are provided by different manufacturers, and kinds of print data, the image forming devices being capable of interpreting the print data, are different depending on the manufacturers of the image forming devices.

13. The method of distributing a print job according to claim 9, wherein
the device-independent format is EMF (Enhanced Metafile) or XPS (XML Paper Specification).

14. The method of distributing a print job according to claim 9, wherein
the standard print setting storage format is DEVMODE or PrintTicket.

15. A non-transitory computer readable recording medium that records a program executable by a computer of an information processing apparatus, the information processing apparatus including printer driver circuits that drive different image forming devices, respectively, and a virtual printer driver circuit configured to perform re-printing after the virtual printing that describes a document to be printed in a device-independent format to generate device-independent spool data, and describes a variable for printing the document in a standard print setting storage format to generate standard-format job data, the program causing the computer to:
select a printer driver circuit to generate print data of the document based on the variable described in the standard-format job data out of the printer driver circuits by retrieving a table that records combinations of variables of functions and the printer driver circuits in association with each other, and by selecting a printer driver circuit in association with a combination of variables of functions selected by the user; and
supply the device-independent spool data and the standard-format job data to the selected printer driver circuit, wherein
the selected printer driver circuit configured to perform re-printing
obtains the device-independent spool data and the standard-format job data from the distribute circuit,
interprets the device-independent spool data and the standard-format job data and generates print data, an image forming device driven by the selected printer driver circuit being capable of interpreting the print data, the print data including a variable of a function specific to the image forming device driven by the selected printer driver circuit, and
supplies the print data to the image forming device.

* * * * *